(12) United States Patent
Ute et al.

(10) Patent No.: US 11,377,506 B2
(45) Date of Patent: Jul. 5, 2022

(54) VINYL ALCOHOL-VINYL ACETATE COPOLYMER

(71) Applicants: TOKUSHIMA UNIVERSITY, Tokushima (JP); SEKISUI CHEMICAL CO., LTD., Osaka (JP)

(72) Inventors: Koichi Ute, Tokushima (JP); Tomohiro Hirano, Tokushima (JP); Miyuki Oshimura, Tokushima (JP); Yasunari Kusaka, Osaka (JP); Yohei Nishimura, Osaka (JP); Misaki Senoo, Osaka (JP)

(73) Assignees: TOKUSHIMA UNIVERSITY, Tokushima (JP); SEKISUI CHEMICAL CO., LTD., Osaka (JP)

( * ) Notice: Subject to any disclaimer, the term of this patent is extended or adjusted under 35 U.S.C. 154(b) by 175 days.

(21) Appl. No.: 16/762,221

(22) PCT Filed: Nov. 14, 2018

(86) PCT No.: PCT/JP2018/042183
§ 371 (c)(1),
(2) Date: May 7, 2020

(87) PCT Pub. No.: WO2019/098247
PCT Pub. Date: May 23, 2019

(65) Prior Publication Data
US 2020/0347165 A1    Nov. 5, 2020

(30) Foreign Application Priority Data
Nov. 15, 2017 (JP) .............................. JP2017-220388

(51) Int. Cl.
*C08F 8/14* (2006.01)
*C08F 216/06* (2006.01)
*C08F 218/08* (2006.01)

(52) U.S. Cl.
CPC .............. *C08F 8/14* (2013.01); *C08F 216/06* (2013.01); *C08F 218/08* (2013.01)

(58) Field of Classification Search
CPC ......... C08F 8/14; C08F 216/06; C08F 218/08
USPC ....................................................... 524/459
See application file for complete search history.

(56) References Cited

U.S. PATENT DOCUMENTS

| 2016/0194412 A1 | 7/2016 | Fukuhara et al. |
| 2019/0153136 A1 | 5/2019 | Ute et al. |

FOREIGN PATENT DOCUMENTS

| EP | 1 059 371 | 12/2000 | |
| EP | 3 031 830 | 6/2016 | |
| JP | 2-153960 | 6/1990 | |
| JP | 02153960 A | * 6/1990 | |
| JP | 6-234899 | 8/1994 | |
| JP | 06234899 A | * 8/1994 | |
| JP | 9-67441 | 3/1997 | |
| JP | 2001-55414 | 2/2001 | |
| JP | 2001055414 A | * 2/2001 | ............... D01F 6/14 |
| JP | 2016-47799 | 4/2016 | |
| WO | 2015/019614 | 2/2015 | |
| WO | WO-2015019614 A1 | * 2/2015 | .......... B01F 17/0028 |
| WO | 2017/195735 | 11/2017 | |

OTHER PUBLICATIONS

Senoo et al. "Monomer Sequence Analysis of the Poly(vinyl alcohol-Co-Vinyl Acetate)s Prepared by Various Polymer Reactions", Polymer Preprints, Japan vol. 65 No. 2 (2016) (Year: 2016).*

Senoo et al. "Sequence Analysis of the Vinyl alcohol—Vinyl Acetate Copolymers Obtained by Various Polymer Reactions", Polymer Preprints, Japan vol. 65 No. 1 (2016) (Year: 2016).*

Ilyin et al., "Effect of Chain Structure on the Rheological Properties of Vinyl Acetate—Vinyl Alcohol Copolymers in Solution and Bulk", Macromolecules, 2014. (Year: 2014).*

(Continued)

*Primary Examiner* — Michael M. Bernshteyn
(74) *Attorney, Agent, or Firm* — Wenderoth, Lind & Ponack, L.L.P.

(57) ABSTRACT

The present invention provides a vinyl alcohol-vinyl acetate copolymer having excellent solubility and capable of providing a film having high flexibility, high mechanical strength, and high adhesion, and a method for producing a vinyl alcohol-vinyl acetate copolymer. Provided is a vinyl alcohol-vinyl acetate copolymer including a unit of vinyl alcohol and a unit of vinyl acetate, the vinyl alcohol-vinyl acetate copolymer having a triad unit chain ratio $T_{OO}$ of 7.5 or less, where the triad unit chain ratio $T_{OO}$ is obtained using the following formula (1):

[Math. 1]

$$T_{OO} = \frac{[Vac\ content] \times [OOO\ proportion] \times 2}{[VOH\ content] \times [AOO\ proportion]} \quad (1)$$

wherein the VOH content ratio represents the amount of the unit of vinyl alcohol, the Vac content ratio represents the amount of the unit of vinyl acetate, the OOO proportion represents the proportion of a triad OOO, and the AOO proportion represents the proportion of a triad AOO.

8 Claims, No Drawings

(56) References Cited

OTHER PUBLICATIONS

Denisova et al., "Chain Statistics in Vinyl Acetate—Vinyl Alcohol Multiblock Copolymers", Polymer Science, Series B, 2012, 54, 7-8, 375-3 82, ISSN: 1560-0904. (Year: 2012).*
Senoo et al. "Monomer Sequence Analysis of the Poly(vinyl alcohol-Co-Vinyl Acetate)s Prepared by Various Polymer Reactions", Polymer Preprints, Japan, 2016, vol. 65 No. 2 (2016).*
Senoo et al. "Sequence Analysis of the Vinyl alcohol—Vinyl Acetate Copolymers Obtained by Various Polymer Reactions", Polymer Preprints, Japan, 2016, vol. 65 No. 1 (2016).*
Ilyin et al., "Effect of Chain Structure on the Rheological Properties of Vinyl Acetate—Vinyl Alcohol Copolymers in Solution and Bulk", Macromolecules, 2014, 47, 4790-4804 (2014).*
Denisova et al. "Chain Statistics in Vinyl Acetate—Vinyl Alcohol Multiblock Copolymers", Polymer Science, Series B, 2012, 54, 7-8, 375-382 (2012).*
Extended European Search Report dated Sep. 24, 2021 in corresponding European Application No. 18879535.5.
Toppet et al., "Nuclear magnetic resonance studies on sequence distributions in vinyl alchohol—vinyl acetate copolymers", Polymer, vol. 24, No. 5, may 1983, pp. 507-512.
International Search Report dated Feb. 19, 2019 in International (PCT) Application No. PCT/JP2018/042183.
International Preliminary Report on Patentability and Written Opinion of Searching Authority dated May 19, 2020, in International (PCT) Application No. PCT/JP2018/042183.
Senoo et al., "Monomer sequence analysis of the poly(vinyl alcohol-co-vinyl acetate)s prepared by various polymer Reactions", Polymer Preprints, vol. 65, No. 1, May 10, 2016, 4 pages, with English abstract, cited in ISR & IPRP.
Senoo et al., "Monomer sequence analysis of the poly(vinyl alcohol-co-vinyl acetate)s prepared by various polymer Reactions (2)", Polymer Preprints, vol. 65, No. 2, Aug. 24, 2016, 4 pages, with English abstract, cited in ISR & IPRP.
Ilyin et al., "Effect of Chain Structure on the Rheological Properties of Vinyl Acetate—Vinyl Alcohol Copolymers in Solution and Bulk", Macromolecules, 2014, vol. 47, pp. 4790-4804.
Denisova et al., "Chain Statistics in Vinyl Acetate—Vinyl Alcohol Multiblock Copolymers", Polymer Science, Series B, 2012, vol. 54, No. 7-8, pp. 375-382.

* cited by examiner

VINYL ALCOHOL-VINYL ACETATE COPOLYMER

TECHNICAL FIELD

The present invention relates to a vinyl alcohol-vinyl acetate copolymer having excellent solubility and capable of providing a film having high flexibility, high mechanical strength, and high adhesion. The present invention also relates to a method for producing a vinyl alcohol-vinyl acetate copolymer.

BACKGROUND ART

Vinyl alcohol-vinyl acetate copolymers are used in many fields such as fiber processing, paper processing, films, and adhesives, as well as dispersants and binders. Vinyl alcohol-vinyl acetate copolymers are commonly obtained by direct saponification of a polyvinyl ester polymer such as polyvinyl acetate with an alkali or an acid. In saponification using an alkali, the saponification reaction is stopped using an acid. In saponification using an acid, the saponification reaction is stopped using an alkali. Patent Literature 1, for example, discloses a method in which a colloidal solution of silicic anhydride is added after saponification using an alkali or an acid.

However, vinyl alcohol-vinyl acetate copolymers obtained by conventional methods have poor solubility in solvents, and problematically fail to provide a desired effect particularly when used together with aqueous solvents. Especially when low-solubility components are present, they cause the formation of microgel or dissolution residue, leading to filter clogging or reduced transparency.

Increasing the solubility deteriorates the flexibility or mechanical strength of the resulting film, which may cause cracks, or make it difficult to smooth out creases.

Increasing the solubility also reduces the adhesion of the resulting film. Such a film may cause practical problems such as misalignment during the conveying step.

CITATION LIST

Patent Literature

Patent Literature 1: JP H09-067441 A

SUMMARY OF INVENTION

Technical Problem

The present invention aims to provide a vinyl alcohol-vinyl acetate copolymer having excellent solubility and capable of providing a film having high flexibility, high mechanical strength, and high adhesion, and a method for producing a vinyl alcohol-vinyl acetate copolymer.

Solution to Problem

The present invention relates to a vinyl alcohol-vinyl acetate copolymer including a unit of vinyl alcohol and a unit of vinyl acetate, the vinyl alcohol-vinyl acetate copolymer having a triad unit chain ratio $T_{OO}$ of 7.5 or less, where the triad unit chain ratio $T_{OO}$ is obtained using the following formula (1).

The present invention is described in detail below.

[Math. 1]

$$T_{OO} = \frac{[Vac \text{ content}] \times [OOO \text{ proportion}] \times 2}{[VOH \text{ content}] \times [AOO \text{ proportion}]} \quad (1)$$

In the formula (1), the VOH content ratio represents the amount of the unit of vinyl alcohol, the Vac content ratio represents the amount of the unit of vinyl acetate, the OOO proportion represents the proportion of a triad OOO, and the AOO proportion represents the proportion of a triad AOO.

Herein, "AAA, AAO, OAO, AOA, AOO, and OOO" represent triads classified as follows when the vinyl alcohol-vinyl acetate copolymer is divided by triads including the unit of vinyl alcohol (also simply referred to as O) and the unit of vinyl acetate (also simply referred to as A):

"vinyl alcohol-centered triads" include "AOA, AOO, and OOO"; and

"vinyl acetate-centered triads" includes "AAA, AAO, and OAO".

Note that "AOO" and "OOA" are both represented as "AOO", and "AAO" and "OAA" are both represented as "AAO".

The present inventors found out that the monomer chain structure in a vinyl alcohol-vinyl acetate copolymer is associated with the improvement of the properties of the copolymer.

The present inventors made further intensive studies to find out that a vinyl alcohol-vinyl acetate copolymer having excellent solubility and capable of providing a film having high flexibility, high mechanical strength, and high adhesion can be obtained by setting, within a predetermined range, a triad unit chain ratio obtained from the amount of each unit and the proportions of triads. Thus, the present invention was completed.

In particular, in the case of the vinyl alcohol-vinyl acetate copolymer of the present invention, since the lower critical solution temperature (LCST) can be shifted to a higher temperature region, dissolution at a higher temperature can be enabled, which allows the vinyl alcohol-vinyl acetate copolymer of the present invention to be used for a wider variety of applications.

When the vinyl alcohol unit has higher block properties, a hydrogen-bonded structure is formed between molecules or in a molecule, problematically leading to reduction in solubility or gel formation. In the case of the vinyl alcohol-vinyl acetate copolymer of the present invention, the whole polymer chain has a random structure to achieve high solubility, as well as effective prevention of gel formation.

As used herein, "high solubility" means that the vinyl alcohol-vinyl acetate copolymer has excellent ability to be dissolved (dissolution rate or dissolution amount) in a solvent.

As used herein, "effective prevention of gel formation" means that gel formation due to components that are difficult to swell can be prevented in swelling the vinyl alcohol-vinyl acetate copolymer. A vinyl alcohol-vinyl acetate copolymer being less likely to cause such gel formation may also be referred to as having "excellent swellability".

The vinyl alcohol-vinyl acetate copolymer of the present invention has a unit of vinyl alcohol and a unit of vinyl acetate.

The terms "unit of vinyl alcohol" and "unit of vinyl acetate" as used herein refer to "vinyl alcohol" and "vinyl acetate" present in the vinyl alcohol-vinyl acetate copolymer, respectively.

The vinyl alcohol-vinyl acetate copolymer of the present invention has a triad unit chain ratio $T_{OO}$ of 7.5 or less, where the triad unit chain ratio $T_{OO}$ is obtained using the following formula (1).

The triad unit chain ratio $T_{OO}$ is an index to determine, at a triad level, whether a unit connected to a vinyl alcohol-vinyl alcohol chain is vinyl alcohol or vinyl acetate. A triad unit chain ratio $T_{OO}$ of 1 or more indicates that a vinyl alcohol unit is connected to the vinyl alcohol-vinyl alcohol chain, and a triad unit chain ratio $T_{OO}$ close to 0 indicates that a vinyl acetate unit is connected to the vinyl alcohol-vinyl alcohol chain.

In the present invention, the triad unit chain ratio $T_{OO}$ is 7.5 or less, indicating that the vinyl alcohol-vinyl acetate copolymer can provide a film having excellent solubility and high flexibility. The triad unit chain ratio $T_{OO}$ is preferably 6.5 or less, more preferably 6 or less, still more preferably 5 or less, and is preferably 0.01 or more, more preferably 0.5 or more, still more preferably 1.0 or more.

[Math. 2]

$$T_{OO} = \frac{[Vac\ content] \times [OOO\ proportion] \times 2}{[VOH\ content] \times [AOO\ proportion]} \quad (1)$$

In the formula (1), the VOH content ratio represents the amount of the unit of vinyl alcohol, the Vac content ratio represents the amount of the unit of vinyl acetate, the OOO proportion represents the proportion of the triad OOO, and the AOO proportion represents the proportion of the triad AOO.

Besides the triad unit chain ratio $T_{OO}$, triad unit chain ratios $T_{AO}$, $T_{AA}$, and $T_{OA}$ are obtained using the following formulas (2) to (4).

[Math. 3]

$$T_{AO} = \frac{[Vac\ content] \times [AOO\ proportion]}{[VOH\ content] \times [AOA\ proportion] \times 2} \quad (2)$$

[Math. 4]

$$T_{AA} = \frac{[VOH\ content] \times [AAA\ proportion] \times 2}{[Vac\ content] \times [AAO\ proportion]} \quad (3)$$

$$T_{OA} = \frac{[VOH\ content] \times [AAO\ proportion]}{[Vac\ content] \times [OAO\ proportion] \times 2} \quad (4)$$

In the formulas (2) to (4), the VOH content ratio represents the amount of the unit of vinyl alcohol, the Vac content ratio represents the amount of the unit of vinyl acetate, the AOO proportion represents the proportion of the triad AOO, the AOA proportion represents the proportion of the triad AOA, the AAA proportion represents the proportion of the triad AAA, the AAO proportion represents the proportion of the triad AAO, and the OAO proportion represents the proportion of the triad OAO.

In the vinyl alcohol-vinyl acetate copolymer of the present invention, the triad unit chain ratio $T_{AO}$ obtained using the above formula (2) is preferably 0.04 or more and 1.65 or less, more preferably 0.20 or more and 1.15 or less.

The vinyl alcohol-vinyl acetate copolymer of the present invention has a $T_{OO}$ of 7.5 or less, indicating that a relatively large number of triads OOO have a block structure. When the vinyl alcohol-vinyl acetate copolymer further has a $T_{AO}$ of 0.5 or less, the copolymer has the triad AOA, that is, a chain of alternating A and O units. The structure is thus not just a simple block structure, so that excellent solubility, high swellability, and high flexibility can all be achieved.

In the vinyl alcohol-vinyl acetate copolymer of the present invention, the triad unit chain ratio $T_{AA}$ obtained using the above formula (3) is preferably 40 or less. With such a $T_{AA}$, more Os are located next to As despite the Vac compositional ratio, leading to good solubility.

The $T_{AA}$ is more preferably 30 or less and is preferably 0.01 or more.

In the vinyl alcohol-vinyl acetate copolymer of the present invention, the proportion of the triad OOO in the total amount of the vinyl alcohol-centered triads (AOA, AOO, and OOO) is preferably 70% or less. With the proportion within the above range, the unit of vinyl alcohol having a block structure is reduced, resulting in suppression of gel formation as well as enhancement of the solubility at higher temperature.

In the vinyl alcohol-vinyl acetate copolymer of the present invention, the proportion of the triad AAA in the total amount of the vinyl acetate-centered triads (AAA, AAO, and OAO) is preferably 70% or less. With the proportion within the above range, the unit of vinyl acetate having a block structure is reduced, resulting in suppression of gel formation as well as enhancement of the solubility at higher temperature.

The smaller of the proportion of the triad OOO and the proportion of the triad AAA is preferably 50% or less.

In the vinyl alcohol-vinyl acetate copolymer of the present invention, the unit of vinyl alcohol has a mean chain length $L_O$ of preferably 1 or longer, more preferably 1.5 or longer, still more preferably 2.0 or longer.

A preferable upper limit thereof depends on the amount of the unit of vinyl alcohol. In the case where the amount of the unit of vinyl alcohol is smaller than the amount of the unit of vinyl acetate, the mean chain length $L_O$ is preferably 5.9 or shorter.

The "mean chain length $L_O$ of the unit of vinyl alcohol" as used herein can be calculated using the following formula (7).

In the formula (7), "I" represents the intensity obtained by $^1$H-NMR. Specifically, "$I_{OOO}$" represents the intensity of OOO measured by $^1$H-NMR.

[Math. 5]

$$L_O = \frac{I_{OOO} + I_{AOO} + I_{AOA}}{I_{AOA} + I_{AOO}/2} \quad (7)$$

In the vinyl alcohol-vinyl acetate copolymer of the present invention, the mean chain length $L_A$ of the unit of vinyl acetate is preferably 1 or longer, more preferably 1.1 or longer, still more preferably 1.2 or longer. A preferable upper limit thereof depends on the amount of the unit of vinyl acetate. In the case where the amount of the unit of vinyl acetate is smaller than the amount of the unit of vinyl alcohol, the mean chain length $L_A$ of the unit of vinyl acetate is preferably 4 or shorter.

The "mean chain length $L_A$ of the unit of vinyl acetate" as used herein can be calculated using the following formula (8).

[Math. 6]

$$L_A = \frac{I_{AAA} + I_{AAO} + I_{OAO}}{I_{OAO} + I_{AAO}/2} \quad (8)$$

The lower limit of the amount of the unit of vinyl alcohol in the vinyl alcohol-vinyl acetate copolymer of the present invention is preferably 0.2 mol % and the upper limit thereof is preferably 99.8 mol %. With the amount of the unit of vinyl alcohol within such a range, the function of the hydroxyl group that the vinyl alcohol possesses can be imparted to a vinyl alcohol-vinyl acetate copolymer molecule, enabling control of the solubility in water or a solvent. The lower limit of the amount of the unit of vinyl alcohol is more preferably 50 mol % and the upper limit thereof is more preferably 98 mol %.

The lower limit of the amount of the unit of vinyl acetate in the vinyl alcohol-vinyl acetate copolymer of the present invention is preferably 0.2 mol % and the upper limit thereof is preferably 99.8 mol %. With the amount of the unit of vinyl acetate within such a range, the function of the hydroxyl group in the vinyl alcohol can be imparted to a vinyl alcohol-vinyl acetate copolymer molecule, enabling control of the solubility in water or a solvent. The lower limit of the amount of the unit of vinyl acetate is more preferably 2 mol % and the upper limit thereof is more preferably 50 mol %.

The vinyl alcohol-vinyl acetate copolymer of the present invention may have any molecular weight. It preferably has a number average molecular weight of 1,000 to 1,000,000.

The vinyl alcohol-vinyl acetate copolymer of the present invention preferably has a degree of polymerization of 200 to 3,000. When the degree of polymerization is within the above range, good film physical properties can be exhibited.

The vinyl alcohol-vinyl acetate copolymer of the present invention preferably has a melting point of 30° C. to 240° C. The melting point can be measured with a differential scanning calorimeter.

The vinyl alcohol-vinyl acetate copolymer of the present invention preferably has a ratio ($T_{OO}$/VOH) of the $T_{OO}$ to the amount of the unit of vinyl alcohol (VOH) of 0.001 to 0.10, more preferably 0.08 or less.

The vinyl alcohol-vinyl acetate copolymer of the present invention preferably has a product of degree of chain polymerization (PDOH) of 1 or more and 18 or less, where the PDOH is obtained by the following formula (10) using the Too and the degree of polymerization (DP). When the PDOH is within the above range, the vinyl alcohol-vinyl acetate copolymer has a high degree of polymerization while suppressing the formation of hydrogen bonds, reducing the amount of components that are difficult to swell. The resulting film thus can have good general physical property values. The product of degree of chain polymerization is more preferably 2 or more and 15 or less.

[Math. 7]

$$\text{Product of degree of chain polymerization (PDOH)} = T_{OO} \times \log_{10}(DP) \quad (10)$$

The vinyl alcohol-vinyl acetate copolymer of the present invention preferably has a ratio of degree of chain polymerization (RDOH) of 0.01 or more and 2.7 or less, where the RDOH is obtained by the following formula (11) using the Too and the degree of polymerization (DP). When the RDOH is within the above range, the vinyl alcohol-vinyl acetate copolymer has a high degree of polymerization while suppressing the formation of hydrogen bonds, reducing the amount of components that are difficult to swell. The resulting film thus can have good general physical property values. The ratio of degree of chain polymerization is more preferably 0.1 or more and 2.5 or less.

[Math. 8]

$$\text{Ratio of degree of chain polymerization (RDOH)} = T_{OO}/\log_{10}(DP) \quad (11)$$

The vinyl alcohol-vinyl acetate copolymer of the present invention preferably has an A-centered slope value of −5.0 or more and 2.0 or less, where the A-centered slope value is calculated by the following formula (12) using the AAA proportion, the OAO proportion, and the amount of the unit of vinyl acetate (Vac content ratio). When the A-centered slope value is within the above range, the amount of components that are difficult to swell is reduced, so that the resulting film can have good general physical property values. The A-centered slope value is more preferably −4.0 or more and 1.0 or less.

[Math. 9]

$$A\text{-centered slope value} = (AAA \text{ proportion} - OAO \text{ proportion})/(CD \times \text{Vac content}) \quad (12)$$

In the formula (12), CD represents the chemical shift difference between the peaks.

In the vinyl alcohol-vinyl acetate copolymer of the present invention, the product of the amount of the unit of vinyl acetate (Vac content ratio) and the mean chain length $L_A$ (Vac content ratio × mean chain length $L_A$ × 0.01, hereafter, also referred to as acetyl chain ratio) is preferably 2.5 or less, more preferably 1.0 or less, still more preferably 0.25 or less. With the acetyl chain ratio within the above range, excellent solubility and suppression of gel formation can be both achieved.

The vinyl alcohol-vinyl acetate copolymer of the present invention preferably has a randomness value (mean persistence ratio) R of 0.5 or higher. The randomness value R is obtained using the following formula (5) where $L_O$ represents the mean chain length of the unit of vinyl alcohol and $L_A$ represents the mean chain lengths of the unit of vinyl acetate.

The randomness value R is an index to determine whether the whole polymer chain has a block structure or a random structure. When the randomness value R is 0, the whole polymer chain has a block structure. When the randomness value R is 1, the whole polymer chain has a random structure.

When the randomness value R is 2, the unit of vinyl alcohol and the unit of vinyl acetate coexist alternately in a molecule.

When the randomness value R is 0.5 or higher in the present invention, the polyvinyl alcohol-vinyl acetate copolymer of the present invention is considered to be a resin excellent in solubility. The randomness value R is more preferably 0.6 or higher, still more preferably 0.9 or higher, while preferably 2 or lower.

[Math. 10]

$$R = \frac{1}{L_A} + \frac{1}{L_O} \quad (5)$$

The vinyl alcohol-vinyl acetate copolymer of the present invention may have a unit of a different monomer.

The different monomer is not limited. Preferably, it is a monomer having at least one polar group selected from the group consisting of carboxyl, hydroxyl, amide, amino, epoxy, and ether groups and one olefinic double bond. Examples of such a monomer include crotonic acid, maleic acid, fumaric acid, citraconic acid, mesaconic acid, itaconic acid, allyl alcohol, vinyl ether, and allylamine.

The amount of the unit of a different monomer in the vinyl alcohol-vinyl acetate copolymer of the present invention is determined according to the intended use and therefore is not limited. The amount of the unit of a different monomer is preferably 20% by weight or less, more preferably 10% by weight or less, still more preferably 5% by weight or less, relative to the whole vinyl alcohol-vinyl acetate copolymer.

The vinyl alcohol-vinyl acetate copolymer of the present invention is preferably produced by, for example, a method including the step of transesterification of polyvinyl acetate or a raw material vinyl alcohol-vinyl acetate copolymer using a dianionic zincate complex represented by the following formula (6) (transesterification method). The present invention also encompasses such a method for producing the vinyl alcohol-vinyl acetate copolymer.

The vinyl alcohol-vinyl acetate copolymer of the present invention may also be produced by reacetylating polyvinyl alcohol (reacetylation method).

The method for producing the vinyl alcohol-vinyl acetate copolymer of the present invention (transesterification method) includes the step of transesterification of polyvinyl acetate or a raw material vinyl alcohol-vinyl acetate copolymer using a dianionic zincate complex represented by the following formula (6).

The use of the dianionic zincate complex enables favorable production of a vinyl alcohol-vinyl acetate copolymer having a randomness value within a predetermined range. Moreover, the use of the dianionic zincate complex enables progress of the transesterification in a very short reaction time. Specifically, the reaction can proceed in a time roughly one-tenth of the time needed for transesterification using $CH_3ONa$.

[Chem. 1]

$$t\text{-Bu}_n R_{4-n} Zn M_m \quad (6)$$

In the formula (6), n represents an integer of 1 to 4, m represents 1 or 2, Rs may be the same as or different from one another when n represents 1 or 2 and each represent a C1-C8 alkyl, alkenyl, aryl, or arylalkyl group, and M represents lithium or magnesium.

Specific examples of the C1-C8 alkyl, alkenyl, aryl, or arylalkyl group include methyl, ethyl, n-propyl, propyl, n-butyl, i-butyl, sec-butyl, t-butyl, n-pentyl, n-hexyl, vinyl, phenyl, and benzyl groups.

M represents lithium or magnesium. When M represents lithium, m represents 2. When M represents magnesium, m represents 1.

The dianionic zincate complex represented by the above formula (6) is disclosed in JP 2004-292328 A and can be prepared by the method described in JP 2004-292328 A.

Specifically, examples of dilithium salts include dilithium tetra-t-butylzincate, dilithium tri-t-butyl methylzincate, dilithium tri-t-butyl ethylzincate, dilithium tri-t-butyl-n-propylzincate, dilithium tri-t-butyl-n-butylzincate, dilithium tri-t-butyl-1-butylzincate, dilithium tri-t-butyl-sec-butylzincate, dilithium di-t-butyl dimethylzincate, dilithium di-t-butyl diethylzincate, dilithium di-t-butyl di-n-propylzincate, dilithium di-t-butyl di-n-butylzincate, dilithium di-t-butyl di-i-butylzincate, dilithium di-t-butyl di-sec-butylzincate, dilithium t-butyl trimethylzincate, dilithium t-butyl triethylzincate, dilithium t-butyl tri-n-propylzincate, dilithium t-butyl tri-n-butylzincate, dilithium t-butyl tri-i-butylzincate, and dilithium t-butyl tri-sec-butylzincate.

Examples of magnesium salts include magnesium tetra-t-butylzincate, magnesium tri-t-butyl methylzincate, magnesium tri-t-butyl ethylzincate, magnesium tri-t-butyl-n-propylzincate, magnesium tri-t-butyl-n-butylzincate, magnesium tri-t-butyl-1-butylzincate, magnesium tri-t-butyl-sec-butylzincate, magnesium di-t-butyl dimethylzincate, magnesium di-t-butyl diethylzincate, magnesium di-t-butyl di-n-propylzincate, magnesium di-t-butyl di-n-butylzincate, magnesium di-t-butyl di-i-butylzincate, magnesium di-t-butyl di-sec-butylzincate, magnesium t-butyl trimethylzincate, magnesium t-butyl triethylzincate, magnesium t-butyl tri-n-propylzincate, magnesium t-butyl tri-n-butylzincate, magnesium t-butyl tri-i-butylzincate, and magnesium t-butyl tri-sec-butylzincate.

In particular, the dianionic zincate complex represented by the above formula (6) is preferably a dilithium salt, and preferably has a C1-C4 alkyl group. Particularly preferred is dilithium tetra-t-butylzincate (TBZL).

The dianionic zincate complexes may be used alone or in combination of two or more thereof.

The TBZL can be prepared by the method described in Example 1 in JP 2004-292328 A.

The raw material used in the transesterification method may be polyvinyl acetate or a raw material vinyl alcohol-vinyl acetate copolymer.

In the case of using polyvinyl acetate, the vinyl alcohol-vinyl acetate copolymer of the present invention can be prepared in a short reaction time.

In the case of using a raw material vinyl alcohol-vinyl acetate copolymer, the vinyl alcohol-vinyl acetate copolymer of the present invention having a higher randomness value can be prepared.

Moreover, in the case of employing the transesterification method, after transesterification of polyvinyl acetate using a dianionic zincate complex represented by the above formula (6), the resulting vinyl alcohol-vinyl acetate copolymer may be further transesterified using a dianionic zincate complex represented by the above formula (6).

The raw material vinyl alcohol-vinyl acetate copolymer may be, as well as a conventional commercially available vinyl alcohol-vinyl acetate copolymer, a vinyl alcohol-vinyl acetate copolymer obtained by transesterification of polyvinyl acetate using a dianionic zincate complex.

The reaction temperature for the transesterification is not limited, and may be set as appropriate within a range of −80° C. to 200° C. The reaction temperature is within a range of preferably −80° C. to 80° C., more preferably −50° C. to 50° C. The dianionic zincate complex is effective as a reaction catalyst at low temperature and is particularly effective when used in a temperature range of not higher than 50° C.

The transesterification may be performed at a normal pressure or a reduced pressure.

The reaction time of the transesterification may be adjusted such that the transesterification is completed.

Moreover, at the time of the transesterification, by-product alcohol can be removed by azeotropy with an organic solvent.

In the transesterification, the lower limit of the amount of a dianionic zincate catalyst is preferably 0.001 mol and the upper limit thereof is preferably 0.5 mol, per 1 mol of the polyvinyl acetate. The lower limit is more preferably 0.001 mol and the upper limit is more preferably 0.1 mol. The lower limit is still more preferably 0.005 mol and the upper limit is still more preferably 0.05 mol.

In the transesterification of polyvinyl acetate using the dianionic zincate complex, a preferred method includes, for example, dissolving polyvinyl acetate in a solvent, adding the dianionic zincate complex to the solution for carrying out transesterification, and further adding an acid to terminate the transesterification.

The solvent is not limited, and examples thereof include methanol, toluene, dimethyl sulfoxide, ethanol, acetone, diethyl ether, tetrahydrofuran, water, and solvent mixtures containing these.

The transesterification may be performed in a homogeneous system or a heterogeneous system.

The homogeneous system is a system in which a substance is present at a homogeneous concentration, referring to a state where components are dissolved in a solvent. The heterogeneous system is a heterogeneous reaction system in which a substance is localized along with the progress of the reaction, referring to a state where some components such as resin are not dissolved during the progress of the reaction.

The transesterification carried out in a homogeneous system enables production of a vinyl alcohol-vinyl acetate copolymer in which a group of vinyl alcohol-centered triads has a random structure and a group of vinyl acetate-centered triads has a block structure.

The transesterification carried out in a heterogeneous system enables production of a vinyl alcohol-vinyl acetate copolymer in which a group of vinyl alcohol-centered triads has a block structure and a group of vinyl acetate-centered triads has a random structure.

As an exemplary method for reacetylating the polyvinyl alcohol, the polyvinyl alcohol may be added to a solvent containing acetic acid to be reacted.

The vinyl alcohol-vinyl acetate copolymer of the present invention may be used for applications such as raw materials of viscosity modifiers for aqueous solutions, gas barrier coating agents, suspending agents, emulsifiers, polarizers, water-soluble films, dispersants, and various resins.

Advantageous Effects of Invention

The present invention can provide a vinyl alcohol-vinyl acetate copolymer having excellent solubility and capable of providing a film having high flexibility, high mechanical strength, and high adhesion, and a method for producing a vinyl alcohol-vinyl acetate copolymer. Producing a film using the vinyl alcohol-vinyl acetate copolymer of the present invention can effectively prevent trouble such as cracking or difficulty in smoothing out creases, and also can prevent misalignment during conveying.

Producing a film using the vinyl alcohol-vinyl acetate copolymer can also reduce insolubles due to components that are difficult to swell.

DESCRIPTION OF EMBODIMENTS

Embodiments of the present invention are more specifically described with reference to, but not limited to, the following examples.

Example 1

An amount of 1.0 g of polyvinyl acetate (degree of polymerization: 300) was used as a raw material. Impurities were removed from the polyvinyl acetate by ethanol extraction, and then the polyvinyl acetate was dried with a vacuum drier. The purification of polyvinyl acetate was performed in all of the examples and comparative examples below.

An amount of 0.5 g (5.8 mmol) of the purified polyvinyl acetate was dissolved in 22.5 mL of dimethyl sulfoxide (DMSO), and to the solution was added 2.5 mL of methanol and then 0.15 mL (1.5 mol %) of dilithium tetra-t-butylzincate (TBZL) as a catalyst.

The mixture was stirred at 30° C. for five minutes, and hydrochloric acid was added thereto to terminate the reaction. Then, the resulting mixture was subjected to dialysis using acetone and concentration, thereby obtaining a product material (vinyl alcohol-vinyl acetate copolymer).

Example 2

An amount of 0.5 g (5.8 mmol) of polyvinyl acetate (degree of polymerization: 300) was dissolved in 25 mL of methanol, and to the solution was added 0.38 mL (2.5 mol %) of dilithium tetra-t-butylzincate (TBZL) as a catalyst.

The mixture was stirred at 30° C. for 45 minutes, and hydrochloric acid was added thereto to terminate the reaction. Then, the resulting mixture was subjected to dialysis using acetone and concentration, thereby obtaining a product material (vinyl alcohol-vinyl acetate copolymer).

Example 3

An amount of 0.5026 g (11.4 mmol) of polyvinyl alcohol (degree of saponification: >99 mol %, degree of polymerization: 300) was dissolved in a solvent mixture of acetic acid and water (acetic acid:water=5:5) to prepare 10.5 g of a 5% by weight solution of polyvinyl alcohol.

The obtained polyvinyl alcohol solution was stirred at 100° C. for 24 hours and subjected to reprecipitation using acetone, thereby obtaining a product material (reacetylation).

The obtained product material was subjected to a similar operation (reacetylation) using a solvent mixture of acetic acid and water (acetic acid:water=7:3) and then using a solvent mixture of acetic acid and water (acetic acid:water=9:1), thereby obtaining a product material. After the reacetylation using a solvent mixture of acetic acid and water (acetic acid:water=9:1), concentration was carried out to recover a product material (vinyl alcohol-vinyl acetate copolymer).

Example 4

A product material (vinyl alcohol-vinyl acetate copolymer) was obtained as in Example 1, except that the stirring time (reaction time) was changed to 10 minutes.

Example 5

A product material (vinyl alcohol-vinyl acetate copolymer) was obtained as in Example 2, except that the stirring time (reaction time) was changed to 90 minutes.

Example 6

The vinyl alcohol-vinyl acetate copolymer obtained in Example 4 was dissolved in DMSO to a concentration of 2% by weight, and to the solution was added 5 mol % of dilithium tetra-t-butylzincate (TBZL). The mixture was stirred at 30° C. for 24 hours so that intramolecular transesterification was carried out. The resulting mixture was then subjected to dialysis using acetone and concentration, thereby obtaining a product material (vinyl alcohol-vinyl acetate copolymer).

Example 7

A product material (vinyl alcohol-vinyl acetate copolymer) was obtained as in Example 6, except that the raw material used was the vinyl alcohol-vinyl acetate copolymer obtained in Example 5.

Example 8

A product material (vinyl alcohol-vinyl acetate copolymer) was obtained as in Example 4, except that the stirring time (reaction time) was changed to 15 minutes.

Example 9

A product material (vinyl alcohol-vinyl acetate copolymer) was obtained as in Example 5, except that the stirring time (reaction time) was changed to 180 minutes.

Example 10

An amount of 0.5 g (5.8 mmol) of polyvinyl acetate (degree of polymerization: 300) was dissolved in a mixture of 35.4 mL of dimethyl sulfoxide (DMSO) and 8.9 mL of water, and to the solution was added 0.21 g (5.1 mmol) of NaOH. After stirring at 60° C. for 120 minutes, the mixture was subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL). The mixture was stirred at 30° C. for 24 hours so that intramolecular transesterification was carried out. Then, the resulting mixture was subjected to dialysis using acetone and concentration, thereby obtaining a product material (vinyl alcohol-vinyl acetate copolymer).

Example 11

A product material (vinyl alcohol-vinyl acetate copolymer) was obtained as in Example 10, except that the amount of NaOH was changed to 0.16 g (3.9 mmol).

Example 12

An amount of 0.5 g of polyvinyl acetate (degree of polymerization: 300, 5.8 mmol) as a raw material was dissolved in a mixture of 35.0 mL of acetone and 5 mL of water. To the solution was added an aqueous solution of 0.175 g (4.2 mmol) of NaOH in 3.5 mL of water. The mixture was allowed to react at 60° C. for two hours and centrifuged, whereby a product material (vinyl alcohol-vinyl acetate copolymer) was obtained.

The obtained vinyl alcohol-vinyl acetate copolymer was dissolved to a concentration of 2% by weight in DMSO that had been dried with a molecular sieve. To the solution was added 1.5 mol % of dilithium tetra-t-butylzincate (TBZL), followed by stirring at 30° C. for 24 hours to carry out intramolecular transesterification. The resulting mixture was subjected to dialysis using acetone and concentration, thereby obtaining a product material (vinyl alcohol-vinyl acetate copolymer).

Example 13

A product material (vinyl alcohol-vinyl acetate copolymer) was obtained as in Example 12 except that the stirring time (reaction time) after the addition of TBZL was 17 hours.

Example 14

A product material (vinyl alcohol-vinyl acetate copolymer) was obtained as in Example 12 except that the stirring time (reaction time) after the addition of TBZL was three hours.

Example 15

An amount of 0.5 g of polyvinyl acetate (degree of polymerization: 1,000, 5.8 mmol) was dissolved in 25 mL of methanol, and to the solution was added 0.052 g (0.22 mol %) of NaOH. The mixture was stirred at 40° C. for 60 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 16 hours to carry out intramolecular transesterification. The resulting mixture was subjected to dialysis using acetone and concentration, thereby obtaining a product material (vinyl alcohol-vinyl acetate copolymer).

Example 16

A product material (vinyl alcohol-vinyl acetate copolymer) was obtained as in Example 15 except that the stirring time (reaction time) after the addition of TBZL was 18 hours.

Example 17

A product material (vinyl alcohol-vinyl acetate copolymer) was obtained as in Example 15 except that except that the stirring time (reaction time) after the addition of TBZL was 19 hours.

Example 18

An amount of 0.5 g of polyvinyl acetate (degree of polymerization: 600, 5.8 mmol) was dissolved in 25 mL of methanol, and to the solution was added 0.045 g (0.19 mol %) of NaOH. The mixture was stirred at 60° C. for 120 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 21 hours to carry out intramolecular transesterification. The resulting mixture was subjected to dialysis using acetone and concentration, thereby obtaining a product material (vinyl alcohol-vinyl acetate copolymer).

Example 19

An amount of 0.5 g of polyvinyl acetate (degree of polymerization: 600, 5.8 mmol) was dissolved in 25 mL of methanol, and to the solution was added 0.047 g (0.20 mol %) of NaOH. The mixture was stirred at 60° C. for 120 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 19 hours to carry out intramolecular transesterification. The resulting mixture was subjected to dialysis using acetone and concentration, thereby obtaining a product material (vinyl alcohol-vinyl acetate copolymer).

Example 20

An amount of 0.5 g of polyvinyl acetate (degree of polymerization: 600, 5.8 mmol) was dissolved in 25 mL of methanol, and to the solution was added 0.047 g (0.20 mol %) of NaOH. The mixture was stirred at 60° C. for 120 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 24 hours to carry out intramolecular transesterification. The resulting mixture was subjected to dialysis using acetone and concentration, thereby obtaining a product material (vinyl alcohol-vinyl acetate copolymer).

Example 21

An amount of 0.5 g of polyvinyl acetate (degree of polymerization: 1,450, 5.8 mmol) was dissolved in 25 mL of methanol, and to the solution was added 0.040 g (0.17 mol %) of NaOH. The mixture was stirred at 60° C. for 120 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 24 hours to carry out intramolecular transesterification. The resulting mixture was subjected to dialysis using acetone and concentration, thereby obtaining a product material (vinyl alcohol-vinyl acetate copolymer).

Example 22

An amount of 0.5 g of polyvinyl acetate (degree of polymerization: 1,450, 5.8 mmol) was dissolved in 25 mL of methanol, and to the solution was added 0.045 g (0.19 mol %) of NaOH. The mixture was stirred at 60° C. for 120 minutes, and then subjected to dialysis using methanol and concentration, thereby obtaining a product material (vinyl alcohol-vinyl acetate copolymer).

The obtained vinyl alcohol-vinyl acetate copolymer was dissolved in DMSO to a concentration of 2% by weight, and to the solution was added 5 mol % of dilithium tetra-t-butylzincate (TBZL), followed by stirring at room temperature for 19 hours to carry out intramolecular transesterification. The resulting mixture was subjected to dialysis using acetone and concentration, thereby obtaining a product material (vinyl alcohol-vinyl acetate copolymer).

Comparative Example 1

An amount of 0.5 g (5.8 mmol) of polyvinyl acetate (degree of polymerization: 300) was dissolved in a mixture of 35.4 mL of acetone and 8.9 mL of water, and to the solution was added 0.12 g (2.9 mmol) of NaOH.

The mixture was stirred at 60° C. for 120 minutes and then subjected to concentration using an evaporator, thereby obtaining a product material (vinyl alcohol-vinyl acetate copolymer).

Comparative Example 2

An amount of 0.5 g (5.8 mmol) of polyvinyl acetate (degree of polymerization: 300) was dissolved in 22.5 mL of dimethyl sulfoxide (DMSO), and to the solution was added 2.5 mL of methanol and then 4.8 mg (1.5 mol %) of $CH_3ONa$ as a catalyst.

The mixture was stirred at 30° C. for 80 minutes, and an excessive amount of acetic acid was added thereto to terminate the reaction. The resulting mixture was then subjected to dialysis using acetone and concentration, thereby obtaining a product material (vinyl alcohol-vinyl acetate copolymer).

Comparative Example 3

An amount of 0.5 g (5.8 mmol) of polyvinyl acetate (degree of polymerization: 300) was dissolved in 25 mL of methanol, and to the solution was added 8.6 mg (2.5 mol %) of $CH_3ONa$ as a catalyst.

The mixture was stirred at 30° C. for 17 hours, and an excessive amount of acetic acid was added thereto to terminate the reaction. The resulting mixture was then subjected to dialysis using acetone and concentration, thereby obtaining a product material (vinyl alcohol-vinyl acetate copolymer).

Comparative Example 4

An amount of 0.5 g (5.8 mmol) of polyvinyl acetate (degree of polymerization: 300) was dissolved in a mixture of 35.4 mL of dimethyl sulfoxide (DMSO) and 8.9 mL of water, and to the solution was added 0.12 g (2.9 mmol) of NaOH.

The mixture was stirred at 60° C. for 120 minutes and then subjected to dialysis using methanol and concentration, thereby obtaining a product material (vinyl alcohol-vinyl acetate copolymer).

Comparative Example 5

An amount of 0.5 g (5.8 mmol) of polyvinyl acetate (degree of polymerization: 300) was dissolved in a mixture of 35.0 mL of acetone and 5 mL of water, and to the solution was added an aqueous solution of 0.175 g (4.2 mmol) of NaOH in 3.5 mL of water. The mixture was allowed to react at 60° C. for 2 hours and centrifuged, thereby obtaining a product material (vinyl alcohol-vinyl acetate copolymer).

Comparative Example 6

An amount of 0.5 g (5.8 mmol) of polyvinyl acetate (degree of polymerization: 600) was dissolved in a mixture of 35.4 mL of acetone and 8.9 mL of water, and to the solution was added 0.045 g (0.19 mol %) of NaOH.

The mixture was stirred at 60° C. for 120 minutes and then subjected to concentration using an evaporator, thereby obtaining a product material (vinyl alcohol-vinyl acetate copolymer).

Comparative Example 7

An amount of 0.5 g (5.8 mmol) of polyvinyl acetate (degree of polymerization: 600) was dissolved in a mixture of 35.4 mL of acetone and 8.9 mL of water, and to the solution was added 0.047 g (0.20 mol %) of NaOH.

The mixture was stirred at 60° C. for 120 minutes and then subjected to concentration using an evaporator, thereby obtaining a product material (vinyl alcohol-vinyl acetate copolymer).

Comparative Example 8

An amount of 0.5 g (5.8 mmol) of polyvinyl acetate (degree of polymerization: 600) was dissolved in a mixture of 35.4 mL of acetone and 8.9 mL of water, and to the solution was added 0.052 g (0.22 mol %) of NaOH.

The mixture was stirred at 60° C. for 120 minutes and then subjected to concentration using an evaporator, thereby obtaining a product material (vinyl alcohol-vinyl acetate copolymer).

TABLE 1

| | | First step | | | | | |
|---|---|---|---|---|---|---|---|
| | | Additive | | Reaction | Reaction | Reaction | Reaction |
| | Raw material | Type | Amount | temperature | time | system | method |
| Example 1 | Polyvinyl acetate | TBZL | 1.5 mol % | 30° C. | 5 minutes | Homogeneous | Transesterification |
| Example 2 | Polyvinyl acetate | TBZL | 2.5 mol % | 30° C. | 45 minutes | Heterogeneous | Transesterification |
| Example 3 | Polyvinyl alcohol | Acetic acid | — | 100° C. | 24 hours | Homogeneous | Reacetylation |
| Example 4 | Polyvinyl acetate | TBZL | 1.5 mol % | 30° C. | 10 minutes | Homogeneous | Transesterification |
| Example 5 | Polyvinyl acetate | TBZL | 2.5 mol % | 30° C. | 90 minutes | Heterogeneous | Transesterification |
| Example 6 | Polyvinyl acetate | TBZL | 1.5 mol % | 30° C. | 10 minutes | Homogeneous | Transesterification |
| Example 7 | Polyvinyl acetate | TBZL | 1.5 mol % | 30° C. | 90 minutes | Heterogeneous | Transesterification |
| Example 8 | Polyvinyl acetate | TBZL | 1.5 mol % | 30° C. | 15 minutes | Homogeneous | Transesterification |
| Example 9 | Polyvinyl acetate | TBZL | 2.5 mol % | 30° C. | 180 minutes | Heterogeneous | Transesterification |
| Example 10 | Polyvinyl acetate | NaOH | 5.1 mmol | 60° C. | 120 minutes | Homogeneous | Direct saponification |
| Example 11 | Polyvinyl acetate | NaOH | 3.9 mmol | 60° C. | 120 minutes | Homogeneous | Direct saponification |
| Example 12 | Polyvinyl acetate | NaOH | 4.2 mmol | 60° C. | 120 minutes | Homogeneous | Direct saponification |
| Example 13 | Polyvinyl acetate | NaOH | 4.2 mmol | 60° C. | 120 minutes | Homogeneous | Direct saponification |
| Example 14 | Polyvinyl acetate | NaOH | 4.2 mmol | 60° C. | 120 minutes | Homogeneous | Direct saponification |
| Example 15 | Polyvinyl acetate | NaOH | 0.22 mol % | 40° C. | 60 minutes | Heterogeneous | Transesterification |
| Example 16 | Polyvinyl acetate | NaOH | 0.22 mol % | 40° C. | 60 minutes | Heterogeneous | Transesterification |
| Example 17 | Polyvinyl acetate | NaOH | 0.22 mol % | 40° C. | 60 minutes | Heterogeneous | Transesterification |
| Example 18 | Polyvinyl acetate | NaOH | 0.19 mol % | 60° C. | 120 minutes | Heterogeneous | Transesterification |
| Example 19 | Polyvinyl acetate | NaOH | 0.20 mol % | 60° C. | 120 minutes | Heterogeneous | Transesterification |
| Example 20 | Polyvinyl acetate | NaOH | 0.20 mol % | 60° C. | 120 minutes | Heterogeneous | Transesterification |
| Example 21 | Polyvinyl acetate | NaOH | 0.17 mol % | 60° C. | 120 minutes | Heterogeneous | Transesterification |
| Example 22 | Polyvinyl acetate | NaOH | 0.19 mol % | 60° C. | 120 minutes | Heterogeneous | Transesterification |
| Comparative Example 1 | Polyvinyl acetate | NaOH | 2.9 mmol | 60° C. | 120 minutes | Heterogeneous | Direct saponification |
| Comparative Example 2 | Polyvinyl acetate | CH$_3$ONa | 1.5 mol % | 30° C. | 80 minutes | Homogeneous | Transesterification |
| Comparative Example 3 | Polyvinyl acetate | CH$_3$ONa | 2.5 mol % | 30° C. | 17 hours | Heterogeneous | Transesterification |
| Comparative Example 4 | Polyvinyl acetate | NaOH | 2.9 mmol | 60° C. | 120 minutes | Homogeneous | Direct saponification |
| Comparative Example 5 | Polyvinyl acetate | NaOH | 4.2 mmol | 60° C. | 120 minutes | Homogeneous | Direct saponification |
| Comparative Example 6 | Polyvinyl acetate | NaOH | 0.19 mol % | 60° C. | 120 minutes | Heterogeneous | Direct saponification |
| Comparative Example 7 | Polyvinyl acetate | NaOH | 0.20 mol % | 60° C. | 120 minutes | Heterogeneous | Direct saponification |
| Comparative Example 8 | Polyvinyl acetate | NaOH | 0.22 mol % | 60° C. | 120 minutes | Heterogeneous | Direct saponification |

| | Second step | | | | |
|---|---|---|---|---|---|
| | Additive | Reaction temperature | Reaction time | Reaction system | Reaction method |
| Example 1 | — | — | — | — | — |
| Example 2 | — | — | — | — | — |
| Example 3 | — | — | — | — | — |
| Example 4 | — | — | — | — | — |
| Example 5 | — | — | — | — | — |
| Example 6 | TBZL | 30° C. | 24 hours | Homogeneous | Intramolecular transesterification |
| Example 7 | TBZL | 30° C. | 24 hours | Homogeneous | Intramolecular transesterification |

TABLE 1-continued

| | | | | | |
|---|---|---|---|---|---|
| Example 8 | — | — | — | — | — |
| Example 9 | — | — | — | — | — |
| Example 10 | TBZL | 30° C. | 24 hours | Homogeneous | Intramolecular transesterification |
| Example 11 | TBZL | 30° C. | 24 hours | Homogeneous | Intramolecular transesterification |
| Example 12 | TBZL | 30° C. | 24 hours | Homogeneous | Intramolecular transesterification |
| Example 13 | TBZL | 30° C. | 17 hours | Homogeneous | Intramolecular transesterification |
| Example 14 | TBZL | 30° C. | 3 hours | Homogeneous | Intramolecular transesterification |
| Example 15 | TBZL | Room temperature | 16 hours | Homogeneous | Intramolecular transesterification |
| Example 16 | TBZL | Room temperature | 18 hours | Homogeneous | Intramolecular transesterification |
| Example 17 | TBZL | Room temperature | 19 hours | Homogeneous | Intramolecular transesterification |
| Example 18 | TBZL | Room temperature | 21 hours | Homogeneous | Intramolecular transesterification |
| Example 19 | TBZL | Room temperature | 19 hours | Homogeneous | Intramolecular transesterification |
| Example 20 | TBZL | Room temperature | 24 hours | Homogeneous | Intramolecular transesterification |
| Example 21 | TBZL | Room temperature | 24 hours | Homogeneous | Intramolecular transesterification |
| Example 22 | TBZL | Room temperature | 19 hours | Homogeneous | Intramolecular transesterification |
| Comparative Example 1 | — | — | — | — | — |
| Comparative Example 2 | — | — | — | — | — |
| Comparative Example 3 | — | — | — | — | — |
| Comparative Example 4 | — | — | — | — | — |
| Comparative Example 5 | — | — | — | — | — |
| Comparative Example 6 | — | — | — | — | — |
| Comparative Example 7 | — | — | — | — | — |
| Comparative Example 8 | — | — | — | — | — |

(Evaluation Methods)

The product materials obtained above were evaluated by the following methods. Table 2 shows the results.

(1) $^1$H-NMR Analysis

Each obtained product material was analyzed by $^1$H-NMR for determination of the composition ratio (VOH: vinyl alcohol, Vac: vinyl acetate) thereof. The $^1$H-NMR analysis was performed using JEOL JNM-ECX500 and a DMSO-$d_6$ solution (1 wt/vol %) at 150° C. To eliminate the water peak, the presaturation method was used for the analysis. The use of the presaturation method eliminates the peak derived from a hydroxy group and thus improves the accuracy of the analysis. The triads were analyzed by NMR using NMR analysis software DELTA Ver. 5 available from Jeol Resonance Inc.

The triad proportion of each of the three vinyl alcohol-centered triads (AOA, AOO, and OOO) and the three vinyl acetate-centered triads (AAA, AAO, and OAO) was calculated from an area obtained by peak fitting. The peak assignments were made with reference to a document (Macromolecules 1982, 15, 1071). Peaks may have a split apex due to the steric structure or the like. For fitting, such a peak was regarded as one peak.

"AOO" and "OOA" were both represented as "AOO", and "AAO" and "OAA" were both represented as "AAO".

Further, the mean chain lengths ($L_O$ and $L_A$) of the unit of vinyl alcohol and unit of vinyl acetate and the triad unit chain ratios ($T_{OO}$, $T_{OA}$, $T_{AO}$, and $T_{AA}$) were calculated.

The $T_{OO}$/VOH, the product of degree of chain polymerization (PDOH), and the ratio of degree of chain polymerization (RDOH) were calculated from the $T_{OO}$, VOH, and degree of polymerization (DP). The A-centered slope value was calculated from the AAA proportion, OAO proportion, and Vac. The chemical shift difference between the peaks was 0.26.

(2) Film Solubility (2-1) Film Production

The obtained product was completely dissolved in ion-exchanged water to a concentration of 5% by weight.

The obtained aqueous solution was applied, and the water was dried at a room temperature of 25° C. until a film was formed. The obtained film was aged at a temperature of 25° C. and a humidity of 50% RH for 24 hours. The obtained film had a thickness of 100 μm.

(2-2) Solubility Evaluation

A sample tube was charged with 0.5 g of the obtained film and 8 mL of ion-exchanged water. While stirring was performed with a magnetic stirrer, the solubility was evaluated according to the following criteria (liquid temperature: 25° C.). The solubility was visually evaluated. The presence or absence of residue was determined after stirring was stopped. For Examples 1, 2, and 3 and Comparative Examples 1, 2, 3, and 4, a mixed solvent of ion-exchanged water and tetrahydrofuran (50/50) was used as the solvent instead of the ion-exchanged water. For Examples 15, 16, and 17, 13.3 mL of ion-exchanged water was used for the evaluation. For Examples 21 and 22, 19.3 mL of ion-exchanged water was used.

○○○ (Excellent): The film was dissolved in less than 5 minutes.

○○ (Very Good): The film was dissolved in 5 minutes or more and less than 20 minutes.

○ (Good): The film was dissolved in 20 minutes to 3 hours.

Δ (Fair): The film was dissolved in more than 3 hours and 120 hours or less.

x (Poor): Floating residue was observed even after 120 hours.

(3) Film Flexibility (Dynamic Viscoelasticity) Evaluation

The film obtained in "(2-1) Film production" was left to stand in an environment at room temperature and a humidity of 40 to 50% for 24 hours. The film was used as a measurement sample.

Thereafter, the loss elastic modulus peak value and the tan δ peak value were measured with a dynamic viscoelasticity measuring apparatus (DVA-200, available from IT Measurement Co., Ltd.) under the following conditions, and evaluated according to the following criteria.
(Measurement Conditions)
Chuck distance: 15 mm
Sample width: 5 mm
Deformation mode: tensile
Set strain: 0.10%
Measurement temperature: from −20° C. to 150° C.
Set temperature increase rate: 20° C./min
Measurement frequency: 10 Hz
(Evaluation Criteria)
○○ (Very Good): The tan δ peak value was 0.4 or more and the loss elastic modulus peak value was 550 MPa or more.
○ (Good): The tan δ peak value was 0.4 or more and the loss elastic modulus peak value was less than 550 MPa.
x (Poor): The tan δ peak value was less than 0.4.
(4) Mechanical Strength (Tensile Property) Evaluation The stress (MPa) at 100% elongation and the elongation at break (%) of the measurement sample obtained in "(3) Film flexibility (dynamic viscoelasticity) evaluation" were measured with a universal material tester (available from Orientec Co., Ltd., TENSILON RTC-1310A) under the following conditions.

Thereafter, the quotient (stress/elongation) of the "stress at 100% elongation" divided by "elongation at break" was calculated and evaluated according to the following criteria. For example, when the stress at 100% elongation is 10 MPa and the elongation at break is 200%, the stress/elongation value is 0.05.
(Measurement Conditions)
Sample width: 5 mm
Chuck distance: 30 mm
Load cell: 1 kN
Test speed: 50 mm/min
Temperature: 24° C.
Humidity: 50% RH
(Evaluation Criteria)
○○○ (Excellent): The stress/elongation value was less than 0.05.
○○ (Very Good): The stress/elongation value was 0.05 or more and less than 0.1.
○ (Good): The stress/elongation value was 0.1 or more and less than 0.3.
x (Poor): The stress/elongation value was 0.3 or more.
(5) Film Tackiness Evaluation The measurement sample obtained in "(3) Film flexibility (dynamic viscoelasticity) evaluation" was heated with a tacking tester (available from Rhesca Co., Ltd., TAC-1000) under the following conditions.

After three minutes after the sample was placed, a SUS probe having a diameter of 5.0 mm was brought into contact with the sample from above. The probe was brought into contact with the sample at a speed of 1 mm/sec, and kept pressed against the sample for five seconds. The probe was then separated from the sample upward at a separation speed of 1 mm/sec, and the value of the peak (separation starting point) appearing in the negative direction was read off. The test was performed three times, and the closest two of the three obtained values were averaged. The average was evaluated according to the following criteria.
(Measurement Conditions)
Sample temperature: 70° C.
Sample heating time: 3 minutes
(Evaluation Criteria)
○○ (Very Good): The peak value was 100 gf or more.
○ (Good): The peak value was 4 gf or more and less than 100 gf.
x (Poor): The peak value was less than 4 gf.
(6) Gel Formation Evaluation (Pulsed NMR, Solid Echo Method Measurement)
(6-1) Sample An amount of 300 mg of the obtained film was weighed. The film was aged in a thermostatic chamber at 23° C. and 50% RH for 48 hours to prevent errors in the evaluation results caused by moisture content changes in the pulsed NMR measurement. The aged PVA film was cut into a strip having a length of 15 mm, whereby a film sample was prepared.
(6-2) Measurement The film sample was placed vertically in a glass sample tube having a diameter of 10 mm (available from Bruker AXS GmbH, product number 1824511, 10 mm in diameter, 180 mm in length, flat bottom).

To the film sample (about 300 mg) was added 2 mL of deuterium oxide (Deuterium oxide 99.9 atom % D) warmed to 60° C. Next, the film was warmed for two hours in a tempering unit (thermostat bath included in "Sample Automation" available from Bruker AXS GmbH) set at 60° C. The sample tube was then placed in a pulsed NMR device (available from Bruker AXS GmbH, "the minispec mq20") for measurement. The measurement was performed at 60° C. by the solid echo method.
<Solid Echo Method>
Scans: 256 times
Recycle delay: 1 sec
Acquisition scale: 1 ms
Temperature: 60° C.
(6-3) Analysis Method The obtained lateral relaxation time T2 was analyzed with data analysis software (available from OriginLab Corporation, ORIGIN Pro (Ver. 2017J)). Specifically, the portion from 0 to 0.3 msec of the free induction decay obtained by the pulsed NMR measurement was fit to the following formula (9) by the least squares method, and thus separated into two components "hard component" and "soft component". The lateral relaxation time of the hard component and the lateral relaxation time of the soft component (T2h and T2s, respectively) were calculated, and the fraction of the hard component and the fraction of the soft component (A1 and A2, respectively) were calculated.

A component with a relaxation time T2h of less than 0.02 msec was taken as the hard component, and a component with a T2s of 0.02 msec or more as the soft component. The two components were subjected to the waveform separation treatment using Gaussian function (Weibull modulus w1 is 2) for the hard component and exponential function (Weibull modulus w2 is 1) for the soft component. The fraction of the hard component was measured, and the gel formation was evaluated according to the following criteria.

[Math. 11]

$$A1 \times \exp(-1/w1 \times (x/T2h)^{w1}) + A2 \times \exp(-1/w2 \times (x/T2s)^{w2}) \quad (9)$$

○○○ (Excellent): The fraction of the hard component was 2% or less.
○○ (Very Good): The fraction of the hard component was more than 2% and 8% or less.
○ (Good): The fraction of the hard component was more than 8% and 10% or less, and the relaxation time T2h was 0.01 msec or more.

Δ (Fair): The fraction of the hard component was more than 8% and 10% or less, and the relaxation time T2h was less than 0.01 msec.
x (Poor): The fraction of the hard component was more than 10%.
(7) Thermal Analysis (Melting Point)
The melting point of the obtained film was measured with DSC6220 (available from Hitachi High-Tech Science Corporation) under the following conditions. The melting point was measured based on the data of the second heating.
(Measurement Conditions)
Sample amount: about 20 mg
Temperature conditions:
25° C.→20° C./min→5° C. (holding time: 5 minutes)
−5° C.→10° C./min→250° C. (holding time: 5 minutes)
250° C.→10° C./min→5° C. (holding time: 5 minutes)
−5° C.→10° C./min→250° C. (holding time: 5 minutes)
250° C.→30° C./min→25° C. (holding time: 10 minutes)
Measurement atmosphere: nitrogen 50 mL/min
(8) Comprehensive Evaluation
In "(2) Film solubility", "(3) Film flexibility evaluation", "(4) Mechanical strength evaluation", "(5) Film tackiness evaluation", and "(6) Film swellability evaluation", ○○○ (Excellent) was allocated 3 points, ○○ (Very good) was allocated 2 points, ○ (Good) was allocated 1 point, Δ (Fair) was allocated 0.5 points, and x (poor) was allocated 0 point. The total point was calculated. The points for "(2) Film solubility" and "(6) Film swellability evaluation" were multiplied five-fold.

TABLE 2

| | Degree of polymerization | Composition (mol %) | | Triad proportion (mol %) | | | | | | Mean chain length | |
|---|---|---|---|---|---|---|---|---|---|---|---|
| | | VOH | Vac | AOA | AOO | OOO | AAA | AAO | OAO | $L_O$ | $L_A$ |
| Example 1 | 300 | 50.6 | 49.4 | 8.3 | 27.3 | 15 | 32.8 | 12.7 | 3.9 | 2.3 | 4.8 |
| Example 2 | 300 | 49.7 | 50.3 | 5.4 | 11.6 | 32.7 | 18.4 | 20.1 | 11.8 | 4.4 | 2.3 |
| Example 3 | 300 | 46.2 | 53.8 | 10.5 | 22.8 | 12.9 | 14.8 | 27.7 | 11.3 | 2.1 | 2.1 |
| Example 4 | 300 | 88.5 | 11.5 | 2.7 | 4.1 | 81.7 | 4.9 | 2.9 | 3.7 | 18.5 | 2.2 |
| Example 5 | 300 | 87.0 | 13.0 | 2 | 3.5 | 81.5 | 5.3 | 3.2 | 4.5 | 23.2 | 2.1 |
| Example 6 | 300 | 90.9 | 9.1 | 1.9 | 5.2 | 83.1 | 0.2 | 1.5 | 7.4 | 18.7 | 1.1 |
| Example 7 | 300 | 91.6 | 8.4 | 1.2 | 4.5 | 85.9 | 0.3 | 1.3 | 6.8 | 26.6 | 1.1 |
| Example 8 | 300 | 90.5 | 9.5 | 5.1 | 4.3 | 81.1 | 3.3 | 3.8 | 2.4 | 12.5 | 2.2 |
| Example 9 | 300 | 93.9 | 6.1 | 2.4 | 3.3 | 88.2 | 1.9 | 1.5 | 2.7 | 23.2 | 1.8 |
| Example 10 | 300 | 88.7 | 11.3 | 1.6 | 11 | 76.1 | 0 | 3.9 | 7.4 | 12.5 | 1.2 |
| Example 11 | 300 | 66.4 | 33.6 | 2.2 | 13.7 | 50.5 | 1.9 | 12.7 | 19 | 7.3 | 1.3 |
| Example 12 | 300 | 74.8 | 25.2 | 3.3 | 8.9 | 62.6 | 5 | 9.9 | 10.3 | 9.7 | 1.7 |
| Example 13 | 300 | 75.3 | 24.7 | 3.5 | 7.5 | 64.3 | 6.7 | 9.4 | 8.6 | 10.4 | 1.9 |
| Example 14 | 300 | 77.9 | 22.1 | 4.1 | 8.2 | 65.6 | 7.3 | 7.9 | 6.9 | 9.5 | 2.0 |
| Example 15 | 1000 | 76.0 | 24.0 | 4.67 | 15.46 | 55.9 | 5.21 | 9.76 | 9.02 | 6.1 | 1.7 |
| Example 16 | 1000 | 77.5 | 22.5 | 4.77 | 17.43 | 55.3 | 2.47 | 9.47 | 10.59 | 5.7 | 1.5 |
| Example 17 | 1000 | 76.5 | 23.5 | 4.63 | 18.04 | 53.8 | 2.53 | 9.97 | 11.01 | 5.6 | 1.5 |
| Example 18 | 600 | 85.9 | 14.1 | 4.6 | 6.05 | 75.2 | 5.62 | 4.96 | 3.53 | 11.3 | 2.3 |
| Example 19 | 600 | 93.9 | 6.1 | 2.91 | 4.42 | 86.6 | 1.25 | 1.92 | 2.92 | 18.3 | 1.6 |
| Example 20 | 600 | 74.3 | 25.7 | 5.49 | 10.62 | 58.2 | 10.96 | 9.04 | 5.66 | 6.9 | 2.5 |
| Example 21 | 1450 | 84.7 | 15.3 | 4.35 | 6.2 | 74.1 | 6.53 | 5.48 | 3.33 | 11.4 | 2.5 |
| Example 22 | 1450 | 78.3 | 21.7 | 4.29 | 5.57 | 68.5 | 12.76 | 6.12 | 2.8 | 11.1 | 3.7 |
| Comparative Example 1 | 300 | 51.0 | 49.0 | 6.1 | 5.6 | 39.3 | 35.1 | 9.0 | 4.9 | 5.7 | 5.2 |
| Comparative Example 2 | 300 | 44.6 | 55.4 | 3.9 | 7.4 | 33.3 | 43.6 | 9.5 | 2.3 | 5.9 | 7.9 |
| Comparative Example 3 | 300 | 51.1 | 48.9 | 5 | 8.5 | 37.6 | 34.2 | 11.4 | 3.3 | 5.5 | 5.4 |
| Comparative Example 4 | 300 | 51.9 | 48.1 | 3.1 | 8.2 | 40.6 | 34.3 | 10.3 | 3.5 | 7.2 | 5.6 |
| Comparative Example 5 | 300 | 78.1 | 21.9 | 3.5 | 4.4 | 70.2 | 13.8 | 5.5 | 2.6 | 13.7 | 4.1 |
| Comparative Example 6 | 600 | 78.17 | 21.83 | 4.01 | 2.79 | 71.37 | 17 | 3.95 | 0.88 | 14.46 | 7.65 |
| Comparative Example 7 | 600 | 86.31 | 13.69 | 3.96 | 2.57 | 79.78 | 9.83 | 2.99 | 0.87 | 16.46 | 5.79 |
| Comparative Example 8 | 600 | 91.66 | 8.34 | 3.7 | 2.07 | 85.89 | 5.59 | 2.04 | 0.71 | 19.36 | 4.82 |

| | Triad unit chain ratio | | | | Too/ VOH | Product of degree of chain polymerization (PDOH) | Ratio of degree of chain polymerization (RDOH) | A-centered slope value | Evaluation | | |
|---|---|---|---|---|---|---|---|---|---|---|---|
| | $T_{OO}$ | $T_{OA}$ | $T_{AO}$ | $T_{AA}$ | | | | | Solubility Evaluation | Point | Dynamic viscoelasticity Evaluation |
| Example 1 | 1.07 | 1.67 | 1.61 | 5.29 | 0.02 | 2.66 | 0.43 | 2.25 | ○○ | 2 | ○ |
| Example 2 | 5.71 | 0.84 | 1.09 | 1.81 | 0.11 | 14.13 | 2.30 | 0.50 | ○ | 1 | ○ |
| Example 3 | 1.32 | 1.05 | 1.26 | 0.92 | 0.03 | 3.26 | 0.53 | 0.25 | ○○ | 2 | ○ |
| Example 4 | 5.18 | 3.02 | 0.10 | 26.01 | 0.06 | 12.83 | 2.09 | 0.40 | ○○ | 2 | ○ |
| Example 5 | 6.96 | 2.38 | 0.13 | 22.17 | 0.08 | 17.24 | 2.81 | 0.24 | ○○ | 2 | ○ |
| Example 6 | 2.82 | 1.01 | 0.16 | 2.66 | 0.03 | 6.99 | 1.14 | −3.04 | ○○○ | 3 | ○○ |
| Example 7 | 3.50 | 1.04 | 0.17 | 5.03 | 0.04 | 8.67 | 1.41 | −2.98 | ○○○ | 3 | ○○ |

TABLE 2-continued

| | | | | | | | | | | | |
|---|---|---|---|---|---|---|---|---|---|---|---|
| Example 8 | 3.96 | 7.54 | 0.04 | 16.55 | 0.04 | 9.81 | 1.60 | 0.36 | ○ | 1 | ○ |
| Example 9 | 3.47 | 4.28 | 0.04 | 39.00 | 0.04 | 8.60 | 1.40 | −0.50 | ○○ | 2 | ○ |
| Example 10 | 1.76 | 2.07 | 0.44 | 0.00 | 0.02 | 4.37 | 0.71 | −2.52 | ○○ | 2 | ○ |
| Example 11 | 3.73 | 0.66 | 1.58 | 0.59 | 0.06 | 9.24 | 1.51 | −1.96 | ○○ | 2 | ○○ |
| Example 12 | 4.74 | 1.43 | 0.45 | 3.00 | 0.06 | 11.74 | 1.91 | −0.81 | ○○○ | 3 | ○○ |
| Example 13 | 5.62 | 1.67 | 0.35 | 4.35 | 0.07 | 13.93 | 2.27 | −0.30 | ○○○ | 3 | ○○ |
| Example 14 | 4.54 | 2.02 | 0.28 | 6.51 | 0.06 | 11.24 | 1.83 | 0.07 | ○○○ | 3 | ○○ |
| Example 15 | 2.28 | 1.71 | 0.52 | 3.38 | 0.03 | 6.84 | 0.76 | −0.61 | ○○○ | 3 | ○○ |
| Example 16 | 1.84 | 1.54 | 0.53 | 1.79 | 0.02 | 5.53 | 0.61 | −1.39 | ○○○ | 3 | ○○ |
| Example 17 | 1.83 | 1.47 | 0.60 | 1.65 | 0.02 | 5.50 | 0.61 | −1.39 | ○○○ | 3 | ○ |
| Example 18 | 4.09 | 4.28 | 0.11 | 13.79 | 0.05 | 11.35 | 1.47 | 0.57 | Δ | 0.5 | ○○ |
| Example 19 | 2.54 | 5.07 | 0.05 | 20.08 | 0.03 | 7.06 | 0.91 | −1.05 | Δ | 0.5 | ○ |
| Example 20 | 3.79 | 2.31 | 0.33 | 7.02 | 0.05 | 10.52 | 1.36 | 0.79 | ○○ | 2 | ○ |
| Example 21 | 4.33 | 4.54 | 0.13 | 13.15 | 0.05 | 13.69 | 1.37 | 0.80 | Δ | 0.5 | ○ |
| Example 22 | 6.80 | 3.95 | 0.18 | 15.06 | 0.09 | 21.51 | 2.15 | 1.77 | Δ | 0.5 | ○ |
| Comparative Example 1 | 13.49 | 0.96 | 0.44 | 8.12 | 0.26 | 33.40 | 5.44 | 2.37 | x | 1 | ○ |
| Comparative Example 2 | 11.18 | 1.66 | 1.18 | 7.39 | 0.25 | 27.69 | 4.51 | 2.87 | x | 0 | ○ |
| Comparative Example 3 | 8.47 | 1.80 | 0.81 | 6.27 | 0.17 | 20.97 | 3.42 | 2.43 | x | 0 | ○ |
| Comparative Example 4 | 9.18 | 1.59 | 1.23 | 7.19 | 0.18 | 22.73 | 3.70 | 2.46 | x | 0 | ○ |
| Comparative Example 5 | 8.95 | 3.77 | 0.18 | 17.90 | 0.11 | 22.16 | 3.61 | 1.97 | x | 0 | ○ |
| Comparative Example 6 | 14.29 | 8.04 | 0.10 | 30.82 | 0.18 | 39.69 | 5.14 | 2.84 | x | 0 | ○ |
| Comparative Example 7 | 9.85 | 10.83 | 0.05 | 41.45 | 0.11 | 27.36 | 3.54 | 2.52 | x | 0 | ○○ |
| Comparative Example 8 | 7.55 | 15.79 | 0.03 | 60.23 | 0.08 | 20.98 | 2.72 | 2.25 | x | 0 | x |

| | Evaluation | | | | | | | | | |
|---|---|---|---|---|---|---|---|---|---|---|
| | Dynamic viscoelasticity | | Tensile properties | | Tackiness | | Gel formation | | Melting point (° C.) | Comprehensive evaluation |
| | Point | | Evaluation | Point | Evaluation | Point | Evaluation | Point | | |
| Example 1 | 1 | | ○ | 1 | ○ | 1 | ○○○ | 3 | — | 28 |
| Example 2 | 1 | | ○ | 1 | ○ | 1 | ○○○ | 3 | — | 23 |
| Example 3 | 1 | | ○ | 1 | ○ | 1 | ○○○ | 3 | — | 28 |
| Example 4 | 1 | | ○ | 1 | ○ | 1 | ○○ | 2 | — | 23 |
| Example 5 | 1 | | ○ | 1 | ○ | 1 | ○ | 1 | — | 18 |
| Example 6 | 2 | | ○ | 1 | ○ | 1 | ○○○ | 3 | 162.9 | 34 |
| Example 7 | 2 | | ○ | 1 | ○ | 1 | ○○○ | 3 | 171.7 | 34 |
| Example 8 | 1 | | ○ | 1 | ○ | 1 | ○○○ | 3 | — | 23 |
| Example 9 | 1 | | ○ | 1 | ○ | 1 | ○○○ | 3 | — | 28 |
| Example 10 | 1 | | ○○ | 2 | ○ | 1 | ○○○ | 3 | 174.7 | 29 |
| Example 11 | 2 | | ○○ | 2 | ○○ | 2 | ○○○ | 3 | — | 31 |
| Example 12 | 2 | | ○○○ | 3 | ○○ | 2 | ○○○ | 3 | 168.3 | 37 |
| Example 13 | 2 | | ○○○ | 3 | ○○ | 2 | ○○○ | 3 | — | 37 |
| Example 14 | 2 | | ○○○ | 3 | ○○ | 2 | ○○○ | 3 | 165.5 | 37 |
| Example 15 | 2 | | ○○ | 2 | ○○ | 2 | ○○○ | 3 | — | 36 |
| Example 16 | 2 | | ○○ | 2 | ○○ | 2 | ○○○ | 3 | — | 36 |
| Example 17 | 1 | | ○○ | 2 | ○ | 1 | ○○○ | 3 | — | 34 |
| Example 18 | 2 | | ○ | 1 | ○ | 1 | ○○ | 2 | 208.5 | 16.5 |
| Example 19 | 1 | | ○ | 1 | ○ | 1 | ○○ | 2 | 214.8 | 15.5 |
| Example 20 | 1 | | ○ | 1 | ○ | 1 | ○○○ | 3 | 187 | 28 |
| Example 21 | 1 | | ○ | 1 | ○ | 1 | ○○○ | 3 | 202.9 | 20.5 |
| Example 22 | 1 | | ○○○ | 3 | ○ | 1 | ○○○ | 3 | 172 | 22.5 |
| Comparative Example 1 | 1 | | ○ | 1 | ○ | 1 | x | 0 | — | 8 |
| Comparative Example 2 | 1 | | ○ | 1 | ○ | 1 | x | 0 | — | 3 |
| Comparative Example 3 | 1 | | ○ | 1 | ○ | 1 | x | 0 | — | 3 |
| Comparative Example 4 | 1 | | ○ | 1 | ○ | 1 | x | 0 | — | 3 |
| Comparative Example 5 | 1 | | ○ | 1 | ○ | 1 | x | 0 | 177 | 3 |
| Comparative Example 6 | 1 | | ○○ | 2 | ○ | 1 | Δ | 0.5 | 166.6 | 6.5 |
| Comparative Example 7 | 2 | | ○ | 1 | ○ | 1 | ○ | 1 | 225 | 9 |
| Comparative Example 8 | 0 | | ○ | 1 | ○ | 1 | x | 0 | 211.5 | 2 |

INDUSTRIAL APPLICABILITY

The present invention can provide a vinyl alcohol-vinyl acetate copolymer having excellent solubility and capable of providing a film having high flexibility, high mechanical strength, and high adhesion, and a method for producing a vinyl alcohol-vinyl acetate copolymer.

The invention claimed is:

1. A vinyl alcohol-vinyl acetate copolymer comprising a unit of vinyl alcohol and a unit of vinyl acetate,
   the vinyl alcohol-vinyl acetate copolymer having a triad unit chain ratio $T_{OO}$ of 0.5 or higher and 7.5 or less, where the triad unit chain ratio $T_{OO}$ is obtained using the following formula (1):

$$T_{OO} = \frac{[Vac \text{ content}] \times [OOO \text{ proportion}] \times 2}{[VOH \text{ content}] \times [AOO \text{ proportion}]} \quad (1)$$

wherein the VOH content ratio represents the amount of the unit of vinyl alcohol, the Vac content ratio represents the amount of the unit of vinyl acetate, the OOO proportion represents the proportion of a triad OOO, and the AOO proportion represents the proportion of a triad AOO, and
   the vinyl alcohol-vinyl acetate copolymer having a triad unit chain ratio $T_{AO}$ of 0.5 or less, where the triad unit chain ratio $T_{AO}$ is obtained using the following formula (2):

$$T_{AO} = \frac{[Vac \text{ content}] \times [AOO \text{ proportion}]}{[VOH \text{ content}] \times [AOA \text{ proportion}] \times 2} \quad (2)$$

wherein the VOH content ratio represents the amount of the unit of vinyl alcohol, the Vac content ratio represents the amount of the unit of vinyl acetate, the AOO proportion represents the proportion of the triad AOO, and the AOA proportion represents the proportion of a triad AOA.

2. The vinyl alcohol-vinyl acetate copolymer according to claim 1,
   wherein the unit of vinyl alcohol has a mean chain length $L_O$ of 1 or longer.

3. The vinyl alcohol-vinyl acetate copolymer according to claim 1,
   wherein the unit of vinyl acetate has a mean chain length $L_A$ of 1 or longer.

4. The vinyl alcohol-vinyl acetate copolymer according to claim 1,
   wherein the amount of the unit of vinyl alcohol is 0.2 to 99.8 mol %.

5. A method for producing the vinyl alcohol-vinyl acetate copolymer according to claim 1, comprising transesterification of polyvinyl acetate or a raw material vinyl alcohol-vinyl acetate copolymer using a dianionic zincate complex represented by the following formula (6):

$$t\text{-Bu}_n R_{4-n} ZnM_m \quad (6)$$

wherein n represents an integer of 1 to 4, m represents 1 or 2, M represents lithium or magnesium, and R independently represents a $C_1$-$C_8$ alkyl, alkenyl, aryl, or arylalkyl group.

6. The method for producing the vinyl alcohol-vinyl acetate copolymer according to claim 5,
   wherein the dianionic zincate complex is dilithium tetra-t-butylzincate.

7. The method for producing the vinyl alcohol-vinyl acetate copolymer according to claim 5,
   wherein the transesterification is performed in a homogeneous system.

8. The method for producing the vinyl alcohol-vinyl acetate copolymer according to claim 5,
   wherein the transesterification is performed in a heterogeneous system.

* * * * *